2,892,691

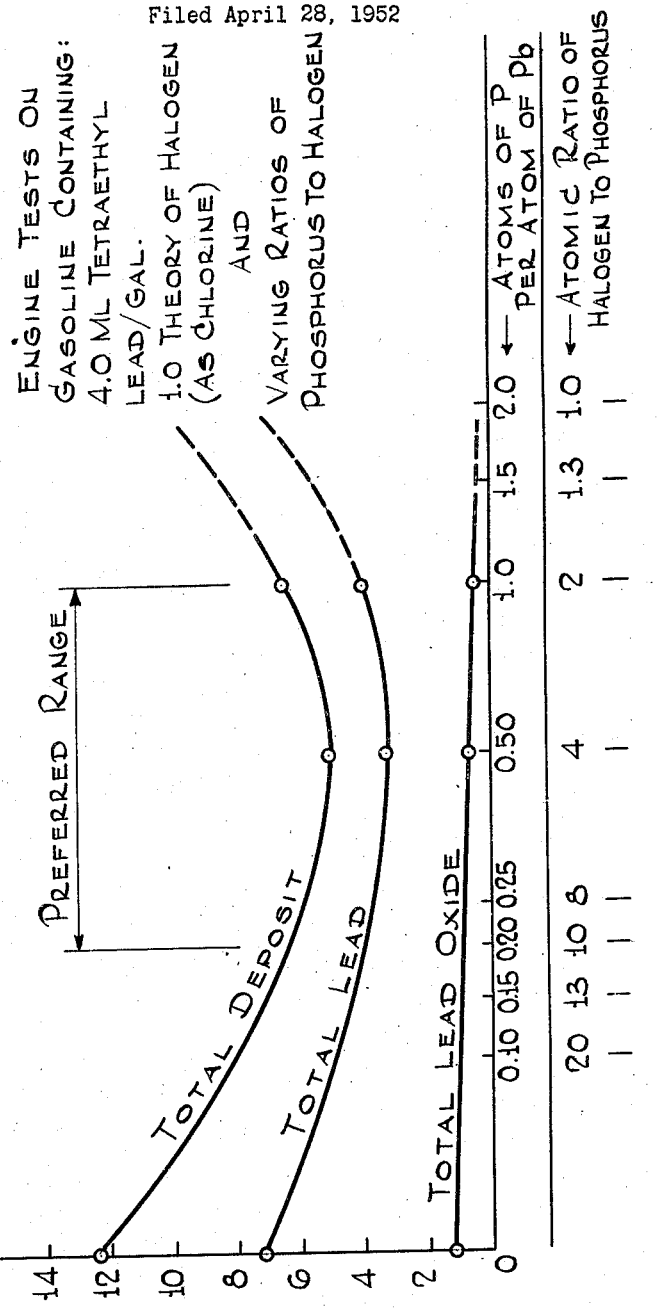

MOTOR FUELS AND MOTOR FUEL ADDITIVES

William C. Howell, Jr., Union, N.J., assignor to Esso Research and Engineering Company, a corporation of Delaware Application April 28, 1952, Serial No. 284,734

14 Claims. (Cl. 44—69)

This invention broadly concerns motor fuel compositions and motor fuel additives for spark-ignition, high-compression engines. It particularly relates to high anti-knock fuel compositions having high scavenging efficiency.

It is an object of the invention to provide fuels which possess not only improved anti-knock characteristics, but also markedly decreased tendencies toward the formation of combustion chamber deposits, short-circuiting of spark plugs, corrosion of valves, and the like. A particular object of the invention is to provide an improved anti-knock composition to be used as an additive in gasoline. A more particular object of the present invention is to increase the anti-knock quality of gasoline-type fuels without causing any deleterious effects in the engines where these fuels are employed.

The problem in anti-knock quality of the field of automotive and aviation gasolines has always been of great importance. Recently, with the advent of engines of higher and higher compression ratios and power outputs, even greater emphasis has been placed on this problem.

It is common knowledge in the art that automotive and aviation engines possess various octane number requirements. The octane number requirement of an engine is briefly the octane rating of the fuel that must be employed in such an engine to prevent the occurrence of knock under any set of operating conditions. This characteristic of an engine in each case is determined largely by two factors, (1) the mechanical design of the engine, and (2) the amount and type of deposits existing in the combustion chambers of the engine. The first named factor embraces such items as the compression ratio of the engine, the exhaust back pressure, placement of the valves, etc. It is readily apparent that these items are controlled entirely by the designers and manufacturers of such engines. In this connection, the designers and manufacturers are contemplating engines of increasingly higher compression ratios in the near future, since the higher the compression ratio of a particular engine becomes, the greater the specific fuel economy of such an engine will be.

The second factor, combustion chamber deposits, is influenced to a great extent by the fuels employed in automotive and aviation engines. The contemplated increase in the compression ratios of these engines, which in itself will require fuels of improved anti-knock quality, is aggravated by the second factor named above—that of combustion chamber deposits.

Combustion chamber deposits in spark ignition engines tend to increase the octane number requirements of such engines for several reasons. For example, the physical volume taken up by these deposits reduces the volume of each combustion chamber with the result that the compression ratio increases. Further, these deposits appear to further promote knocking by acting as a heat insulator. It has also been postulated that these deposits become incandescent at the temperatures existing within a combustion chamber and actually preignite the fuel and air mixture. In this connection, it must be noted that engine knock is a phenomenon associated with the ignition of an unburned mixture of fuel and air ahead of the normal flame front. This untimely ignition may occur as a result of the heat of compression in an engine or, as in the case of combustion chamber deposits, by pre-ignition of the fuel-air mixture caused by the incandescent deposit particles.

The petroleum industry is resorting to a number of methods for approaching the problem of meeting the ever-increasing demand for fuels having higher and higher octane ratings. For example, they are now employing such processes as catalytic cracking, alkylation, hydroforming, polymerization, etc. to produce fuel constituents which have high anti-knock ratings. In addition, refineries are continuing to employ fuel additives such as alkyl lead compounds in gasolines, since these compounds greatly increase the anti-knock quality of the fuels in which they are incorporated.

It is a particular object of this invention to provide concentrated lead fluids of new and novel composition that have improved properties. Throughout the ensuing disclosure, the term "lead fluid" will be employed to refer to the general compositions embraced in this invention, and will designate concentrated lead alkyl solutions intended ultimately for addition to gasolines.

Lead alkyls, unfortunately, have a serious drawback in that they react within the combustion chambers of an engine to form some nonvolatile compounds which deposit on the surfaces of the combustion chambers.

To combat the formation of deposits, scavenging agents in the form of alkyl halides have been incorporated in leaded fuels for the purpose of forming volatile lead halides within the combustion chambers. Generally speaking, ethylene dibromide is employed as a scavenging agent in aviation fuels, while mixtures of ethylene dibromide and ethylene dichloride are used in automotive fuels. The amounts of these additives employed in these fuels are generally expressed in terms of "theories"; one theory being unit mol ratio of halogen to lead. In general, leaded automotive gasolines contain a fluid with one-half theory of ethylene dibromide and one theory of ethylene dichloride, whereas the additive for aviation gasolines has about one theory of ethylene dibromide. These amounts have been found to be about the optimum concentrations for minimizing the formation of objectionable lead deposits in combustion chambers of engines operated on leaded gasolines. However, they are not fully effective in preventing the buildup of deposits. For example, the operating life of aircraft engines between overhauls is limited by the quantity and corrosive nature of the lead deposits formed as a result of operating on leaded gasolines. In fact, for a given engine of this type, the operating time between overhauls is related directly to the concentration of the lead anti-knock compound employed in the fuel. The reaction of ethylene dibromide and/or ethylene dichloride with lead atoms within the combustion chambers of an engine to form volatile lead halides is not a complete one, in that some of the atoms of lead still manage to react with oxygen, and, with sulfur compounds, which are always present in the fuel, to form nonvolatile lead sulphate, lead oxybromide, lead oxychloride, and various lead oxides. The oxygen-containing compounds of lead form particularly harmful deposits, since under the extremely high temperatures encountered in engine combustion chambers, they are extremely corrosive to iron. It is doubtful whether the present extent of these deposits can be tolerated by the high compression engines which will be produced in the not too distant future. Inasmuch as lead alkyls, notably lead tetra-ethyl, are virtually indispensable in the production of high octane number gasoline, it is eminently desirable that more efficient scavenging means be found.

Increasing the amounts of ethylene dibromide and/or ethylene dichloride in a gasoline has been found to be effective in reducing the amount of lead deposits, but other more serious problems are thereby introduced. For example, the valves within such engines operated on fuels containing high concentrations of these scavengers are badly corroded, and the spark plugs are subject to chemical attack. Furthermore, the addition of large amounts of these scavengers has a marked adverse effect on the anti-knock quality of the gasoline.

It is an object of the present invention to subdue the reactions of lead with sulfur and especially oxygen and to promote the formation of the more volatile lead halides which are purged from the engine with the exhaust gases. A particular object of the invention is to provide an improved lead scavenging agent which does not degrade excessively the anti-knock qualities of leaded fuels. According to the invention, these objects may now be achieved by the use of halogenated organic compounds of phosphorus. These compounds can be incorporated directly within a leaded fuel, but are preferably included in the lead fluid which is added to a fuel.

More specifically, the present invention contemplates the use of halogen-containing alkyl, aryl, and alkenyl derivatives of phosphorus, having controlled halogen to phosphorus ratios.

These compounds should be soluble in gasoline. Further, they should be reasonably volatile, preferably boiling in the range of 300° to 650° F. It is particularly desired that these compounds be sufficiently volatile to vaporize along with a gasoline, and especially with tetraethyl lead. The amount of any particular compound added to a gasoline or lead fluid additive should be such that the atomic ratio of phosphorus to lead in the final gasoline or additive blend is from 0.2/1 to 1.0/1, and preferably about 0.5/1. In addition the halide content of the blend should be from 1.0 to 3.0 atoms of halide per atom of lead (0.5 to 1.5 theories) and preferably about 2.0 atoms (1.0 theory) of halide per atom of lead. It is particularly preferred that all of the phosphorus and halide added to a fuel be present in the same molecule.

The atomic ratio of halogen to phosphorus within each molecule of additive is desired to be from 2/1 to 10/1 and preferably about 4/1. Where the molecule is deficient in one constituent, the deficiency which would necessarily result in the lead fluid or gasoline may be made up by adding materials which are rich in the deficient constituent. For example, where the additive desired to be used in a lead fluid is deficient in halide, it is contemplated that small amounts of ethylene dibromide or ethylene dichloride may be employed. Again, two compounds (one rich in phosphorus and deficient in halide—the other deficient in phosphorus and rich in halide) may be used together to arrive at the proper phosphorus and halide levels. Of the various halides, the bromine and chlorine compounds are preferred for the purposes of this invention. However, such compensation of deficiency is less preferable than having approximately the correct ratio of halogen to phosphorus in a single compound or in each component of a mixture.

Particularly desirable compounds for this purpose are the halogen-containing alkyl, aryl, and alkenyl phosphines, phosphates, phosphites, phosphonium salts, phosphine oxides, phosphonites, phosphinites, phosphonates, and phosphinates. Considering first the phosphines, derivatives of primary, secondary, or tertiary phosphines may be employed, of which $PH_3$ (phosphine) possesses the simplest structure. The compounds are preferably selected for minimum toxicity and maximum stability, since the phosphines are generally toxic and easily oxidizable. It is contemplated that one or more of the hydrogen atoms in the phosphine molecule may be replaced with halogenated alkyl, aryl, or alkenyl groups. The groups may be identical as to chemical type and size, or they may vary in both these respects. It will be noted that the phosphines in general form the ternary and quaternary compounds directly when reacted with alkyl halides. Typical compounds of this class suitable for the practice of this invention are di-haloethyl phosphine, di-halophenyl phosphine, tri-halophenyl phosphine, and haloethyl-halophenyl phosphine, wherein the halogen is preferably bromine or chlorine.

The secondary and tertiary phosphines may also be reacted with halogens directly to form organic phosphine halides in which the halogens are attached directly to the phosphorus atom. These reaction products are also within the scope of the present invention and in particular the chloride and bromide compounds. If the phosphine halides as such contain fewer than two atoms of halogen, it is desirable that the alkyl, aryl or alkenyl groups in the phosphine molecule contain sufficient additional halogen to maintain the proper halogen/phosphorus ratio within the additive molecule. Typical compounds are ethyl dihalo phosphine, phenyl dihalo phosphine, halophenyl dihalo phosphine, and the like, where the halogen is preferably bromine or chlorine.

The simplest phosphate and phosphite molecules are $H_3PO_4$ and $H_3PO_3$ respectively. According to the present invention the hydrogens in these compounds are replaced with alkyl, aryl, and alkenyl groups. One or more of these groups are halogenated to give the halogen/phosphorus ratios stated earlier. Tri-chloroethyl phosphate, tri-chlorobutyl phosphate, tri-chlorophenyl phosphate, chloroethyl-di-chlorophenyl phosphate, and the corresponding bromo compounds are examples of compounds of this type.

Similarly, phosphonates having the structure $$R-P(:O)(OR')_2$$

can be employed, where R and R' are alkyl, aryl, or alkenyl groups, with one or more of these groups containing halogen. Thus chloroethyl benzene phosphonate, chlorophenyl benzene phosphonate, chloro diethyl octene phosphonate, di-chlorobutyl dichloroethyl phosphonate, and the like and the corresponding bromine structures typify this type of compound.

Phosphine oxides are produced by oxidizing the tertiary phosphines. For example, $R_3PO$ is formed by the oxidation of $R_3P$, R being an alkyl, aryl or alkenyl group. It is to be understood that the organic groups may vary in size and type within any given molecule. Again, one or more of these groups must contain sufficient halogen to give the molecule as a whole the proper halogen/phosphorus ratio. Tri-chloroethyl phosphine oxide, tri-chlorophenyl phosphine oxide, tri-bromoethyl phosphine oxide, and tri-bromophenyl phosphine oxide are typical compounds of this class.

Whereas the halogen-containing derivatives of phosphines, phosphates, phosphites, and phosphine oxides have been described above in detail, it is to be understood that the invention also embraces other halogen-containing phosphorus compounds, such as phosphonites, phosphinites, phosphonates, phosphinates, and phosphonium salts. It is not intended to limit the invention to the specific examples given.

It will be understood that the phosphorus-halogen compounds described above may be used individually or in combination in a leaded gasoline or preferably in a lead tetra-ethyl fluid. Slight deficiencies in either phosphorus or halogen may be made up by addition of suitable compounds rich in the deficient element as described earlier. It is particularly desired, however, that the proper amounts of phosphorus and halogen be present in a single compound.

Other constituents of the fuel additive compositions of this invention are conventional. Thus a number of antiknock agents, dyes, scavenging agents, anti-oxidants, stabilizers, metal-deactivators, rust preventives, and the like may be used. Examples of suitable anti-knock agents are the volatile lead alkyl compounds, notably lead tetraethyl, lead tetramethyl, lead tri-methyl ethyl, lead di-methyl diethyl, etc.

Other constituents of the fuel compositions of this invention are also conventional. Thus the base fuel may consist of virgin, thermally cracked, catalytically cracked, polymerized, or alkylated hydrocarbons and mixtures thereof boiling in the gasoline boiling range. In general, any gasoline-type fuel may be improved. The lead anti-knock agent to be incorporated in the fuel again may consist of any of the conventionally recognized lead anti-knock agents described above. The quantity of lead anti-knock agent is the quantity ordinarily used which is generally in the range of about 0.5 to 4.6 cc. of active lead compound per gallon of fuel. In addition to these fuel constituents, other fuel additives may be employed, such as gum flux agents, solvent oils, dyes, gum inhibitors, lead stabilizers, carburetor anti-icing agents, etc.

To demonstrate the effectiveness of using a halogen-containing organic phosphorus compound as a scavenging agent, data were obtained in actual engine tests to determine the amount of combustion chamber and engine deposits encountered when burning fuels containing various scavenging agents. The motor gasoline employed in these tests was selected from conventional stocks and consisted of a blend of $C_4$ hydrocarbons, and straight run, thermally cracked, and catalytically cracked naphthas, having a boiling range of about 90° F. to 440° F. and having an ASTM-Motor Method Octane Number of 68 to which was added 4 cc./gallon of pure tetraethyl lead. A single cylinder Lauson engine was used in these tests, and runs were made for 40 hours. At the end of the test period the total deposit found in the combustion chamber was carefully removed and weighed. Deposits formed on the spark plug, exhaust valve, and exhaust port were handled in a similar manner. The combustion chamber deposit in each run was quantitatively analyzed. Runs were made employing the leaded base fuel to which was added respectively one theory of ethylene dichloride; one theory of ethylene dichloride plus one atom of phosphorus as triethyl phosphate per atom of lead; one theory of ethylene dichloride plus 0.5 atom of phosphorus per atom of lead; and tri-2-chloro-ethyl phosphate in the amount to give one theory of chlorine and 0.66 atom of phosphorus per atom of lead. The results of these tests are indicated in Table 1.

It is readily apparent from the above data that the use of an organic phosphorus compound as a scavenging agent in leaded fuels greatly reduces the amount of engine deposits formed in an engine. More importantly, it also reduces markedly the quantity of lead present in the deposit, as well as the harmful deposits of lead oxide and lead sulfate. It further appears from the above table that a halogenated organic phosphorus compound scavenges more efficiently than does a combination of an unhalogenated organic phosphorus compound and a conventional alkyl halide. Thus, when using tri-2-chloro ethyl phosphate in a concentration to give 1.0 theory of halogen and 0.66 atom of phosphorus per atom of lead, only 0.3 gram of the extremely corrosive lead oxide was retained in the combustion chamber deposit. This is less than half as much lead oxide as the 0.67 gram obtained when using the same concentration of halogen and phosphorus added in separate molecules, based on interpolation of the data of Table 1 for 1.0 and 0.5 atoms of phosphorus per atom of lead. Moreover, the total amount of lead retained in the combustion chamber when using the halogenated phosphorus compound, tri-2-chloro ethyl phosphate, is less than the amount retained when using an equivalent concentration of halogen and phosphorus added as separate compounds.

Referring to the drawing, it will be noted that the halogen to phosphorus ratio existing in a gasoline has a very marked effect on the amount and composition of the combustion chamber deposits formed in an engine. From the drawing it will be seen that the total deposits and total lead deposits are at a minimum when a halogen to phosphorus atomic ratio of about 4/1 is employed in a gasoline. The amounts of these deposits are very near the minimum value for halogen to phosphorus ratios between 2/1 and 10/1. These ratios correspond to phosphorus to lead atomic ratios of 0.2/1 to 1.0/1. It will also be noted that the total amount of lead present as lead oxide is at a very low level throughout these ranges.

A peculiar advantage of using a halogenated organic phosphorus compound over a combination of an unhalogenated phosphorus compound and a conventional halide scavenger has been found to exist. This is that the halogenated organic phosphorus compounds exhibit substantially less pro-knock effect.

The various fuel blends tested and described in Table 1, as well as a sample of the leaded gasoline containing no scavenging agent, were evaluated as to their anti-knock quality by employing ASTM Test D-357-48. This anti-knock test procedure evaluates a fuel in terms of Motor Method Octane Numbers. The results of these tests are listed below in Table 2.

*Table 1*

[Results of 40-Hour Lauson Engine Deposit Retention Tests (Fuel—motor gasoline plus 4.0 cc./gallon of pure TEL)]

| Scavenging Agent | $(CH_2Cl-CH_2O)_3PO$ | Ethylene dichloride | Ethylene dichloride + $(C_2H_5)_3PO_4$ | | |
| --- | --- | --- | --- | --- | --- |
| Halide Conc., Theories | 1.0 | 1.0 | 1.0 | 1.0 | 1.0 |
| Atoms P/Atom Pb | 0.66 |  | 1.0 | ²0.66 | 0.5 |
| Deposit Weights, gms.: |  |  |  |  |  |
| Combustion chamber | 5.6 | 12.5 | 6.5 | 5.5 | 5.0 |
| Spark plug | 0.5 | 0.5 | 0.8 | 0.6 | 0.5 |
| Exhaust Valve | 1.2 | 0.9 | 0.7 | 1.0 | 1.1 |
| Exhaust Port | 0.6 | 2.5 | 0.2 | 0.6 | 0.8 |
| Grams of Lead in Combustion Chamber Deposit ¹ | 3.2 | 7.3 | 4.0 | 3.5 | 3.3 |
| Grams of Lead Oxide in Combustion Chamber Deposit ¹ | 0.3 | 1.3 | 0.4 | 0.65 | 0.8 |

¹ Calculated from analysis of combustion chamber deposits.
² Interpolated from data of tests on 1.0 and 0.5 atoms of phosphorus per atom of lead.

*Table 2*

| Scavenger | Octane Number, ASTM—Motor | Decrease in O.N. | Theories of Chlorine | Atoms P per Atom Pb |
| --- | --- | --- | --- | --- |
| None | 84.8 | 0 | 0 | 0 |
| Ethylene dichloride (conventional one) | 84.6 | 0.2 | 1 | 0 |
| Tri-2-chloro-ethyl phosphate (invention) | 84.4 | 0.4 | 1 | 0.66 |
| Mixture of ethylene dichloride and tri-ethyl phosphate | 81.8 | 3.0 | 1 | 0.66 |

The value of employing a halogen-containing organic phosphorus compound as a scavenging agent in a leaded fuel is very apparent from the above table. Its superiority over a corresponding combination of ethylene dichloride and an unhalogenated organic phosphorus compound is especially notable.

The data in Tables 1 and 2 clearly demonstrate that halogen-containing organic phosphorus compounds possess the unique ability of: (1) minimizing combustion chamber deposits, and (2) having virtually no adverse effect in comparison with conventional scavengers on the octane rating of a fuel in which they are incorporated. Conventional scavening agents such as ethylene dichloride do not markedly suppress the octane number of a fuel, but they also do not scavenge engine deposits as well as the compounds of this invention. Conversely, conventional scavenging agents in combination with organic phosphorus componds scavenge efficiently but also have a very undesirable effect on the octane number of a fuel.

As indicated, therefore, the compositions of this invention embrace conventional anti-knock fluids containing halogenated organic phosphorus compounds as scavenging agents. Further, the compositions of this invention embrace conventional gasoline-type fuels containing anti-knock agents and halogenated organic phosphorus compounds.

It will be noted that the fuels described in this invention may be of several special types such as those used in automobiles, in aviation engines, in tractor engines, and the like, and in others which are generally of lower volatility than conventional gasoline fuels. Special "safety type" fuels of low volatility and high anti-knock quality may also be employed.

What is claimed is:

1. A gasoline motor fuel composition comprising gasoline, a lead-containing antiknock agent in sufficient quantity to raise the octane rating of the gasoline, and a gasoline-soluble halogen-containing organic phosphorus compound in sufficient quantity to reduce combustion deposit formation and provide in the gasoline up to 1 atom of phosphorus per atom of lead, said phosphorus compound having a boiling point in the range of from 300° F. to 650° F. and containing between 2 and 10 atoms of halogen per atom of phosphorus, said halogen being selected from the class consisting of bromine and chlorine.

2. A motor fuel as defined in claim 1 in which the phosphorus compound is a hydrocarbyl phosphate wherein the hydrocarbyl groups are selected from the class consisting of the alkyl, aryl and alkenyl radicals.

3. A motor fuel as defined in claim 1 in which the phosphorus compound is a hydrocarbyl phosphite, the hydrocarbyl groups being selected from the class consisting of the alkyl, aryl and alkenyl radicals.

4. A motor fuel as defined in claim 1 in which the phosphorus compound is a hydrocarbyl phosphonate, the hydrocarbyl groups being selected from the class consisting of the alkyl, aryl and alkenyl radicals.

5. A motor fuel as defined in claim 1 in which the phosphorus compound is a hydrocarbyl phosphine wherein the hydrocarbyl groups are selected from the class consisting of the alkyl, aryl and alkenyl radicals.

6. Motor fuel composition as defined by claim 1 wherein said phosphorus compound supplies to said gasoline from 1 to 3 atoms of halogen per atom of lead.

7. Motor fuel composition as defined by claim 1 wherein said antiknock agent comprises lead tetraethyl in the amount of from 0.5 to 4.6 cc. per gallon of gasoline.

8. Motor fuel composition as defined by claim 1 wherein in said phosphorus compound is present in an amount sufficient to provide about 0.5 atom of phosphorus per atom of lead and in which said phosphorus compound contains about 4 atoms of halogen per atom of phosphorus.

9. A motor fuel as defined in claim 2 in which the hydrocarbyl phosphate is a trialkyl phosphate.

10. A gasoline to which have been added a lead-containing antiknock agent, in sufficient quantity to raise the octane rateing of the gasoline, and tri(2-chloroethyl) phosphate in sufficient quantity to provide in the gasoline from 0.2 to 1 atom of phosphorus per atom of lead.

11. A gasoline containing between 0.5 and 4.6 cc. per gallon of lead tetraethyl and an amount of tri-2-chloro-ethyl phosphate sufficient to provide the gasoline with between 0.2 and 1 atom of phosphorus per atom of lead.

12. A gasoline as defined in claim 11 in which the gasoline contains an amount of the phosphate sufficient to provide about 0.66 atom of phosphorus per atom of lead.

13. A composition of matter for increasing the octane rating of a gasoline without increasing the combustion chamber deposit-forming tendency of the gasoline which consists essentially of lead tetraethyl and an amount of a halogenated, gasoline-soluble organic phosphorus compound boiling between 300° F. and 650° F. sufficient to provide said composition with from 0.2 to 1 atom of phosphorus per atom of lead, said compound containing from 2 to 10 atoms of halogen per atom of phosphorus, said halogen being selected from the class consisting of bromine and chlorine.

14. An antiknock fluid for gasoline which consists essentially of lead tetraethyl and an amount of tri(2-chloro ethyl)phosphate sufficient to provide said antiknock fluid with from 0.2 to 1 atom of phosphorus per atom of lead.

References Cited in the file of this patent

UNITED STATES PATENTS

| 2,291,442 | Bass et al. | July 28, 1942 |
| 2,364,921 | Shokal | Dec. 12, 1944 |
| 2,545,158 | McDermott | Mar. 13, 1951 |

FOREIGN PATENTS

| 500,535 | Belgium | Jan. 31, 1951 |

OTHER REFERENCES

"Suitability of Gasolines as Fuel," by James and Morris, published in "Industrial and Engineering Chemistry," March 1948 issue, vol. 40, No. 3, pages 405–411.